Jan. 21, 1964         S. WYTZES ETAL        3,119,013
X-RAY FLUORESCENT ANALYSIS APPARATUS COMPRISING A CONSTANT
AVERAGE CHANNEL HEIGHT PULSE ANALYZER
Filed Jan. 10, 1961
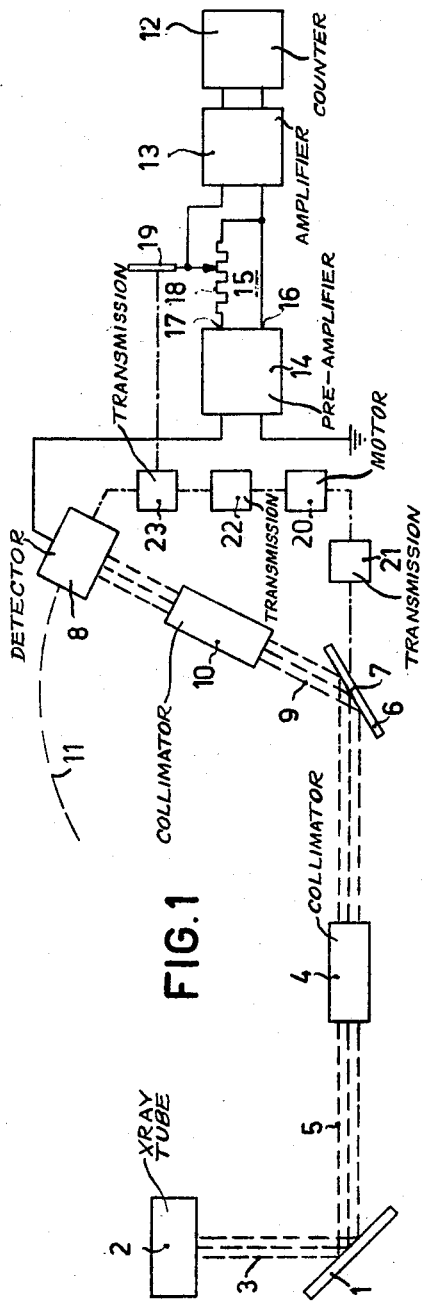
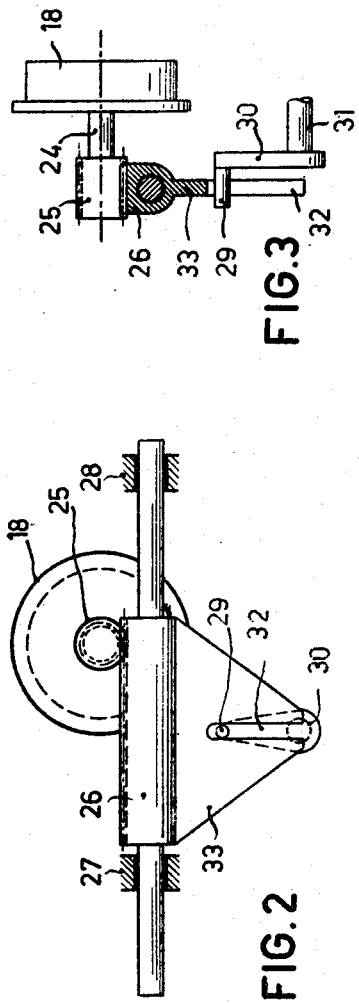
INVENTOR
SJOERD WYTZES
LOUIS .L. A. AUGUSTUS
BY
AGENT United States Patent Office 3,119,013
Patented Jan. 21, 1964

3,119,013
X-RAY FLUORESCENT ANALYSIS APPARATUS COMPRISING A CONSTANT AVERAGE CHANNEL HEIGHT PULSE ANALYZER
Sjoerd Wytzes and Louis Lambert Antoon Augustus, Eindhoven, Netherlands, assignors to North American Philips Company, Inc., New York, N.Y., a corporation of Delaware
Filed Jan. 10, 1961, Ser. No. 81,829
Claims priority, application Netherlands Jan. 29, 1960
6 Claims. (Cl. 250—51.5)

This invention relates to a device for X-ray fluorescent analysis in which X-rays impinge on an object and the resulting secondary radiation is analyzed by an X-ray spectrometer. In a conventional X-ray spectrograph, the secondary X-rays generated by elements in the object due to primary X-rays impinging thereon are intercepted and diffracted by an analyzing crystal at various angles in accordance with Bragg's formula which states:

$$n\lambda = 2d \sin \theta \tag{1}$$

where $\lambda$ is the wave-length of the radiation incident upon the analyzing crystal, $n$ is the order of reflection from the crystal, $d$ is the interplanar spacing between the crystal planes, and $\theta$ is the angle of incidence, and reflection of the incident radiation.

A proportional counter, i.e. a Geiger-Muller tube operating in the proportional counting region, or a scintillation counter may be employed as a detector of the reflected radiation because they produce electric pulses which are proportional to the energy of the photons received. Thus, relationship (1) may be rewritten as:

$$\frac{1}{\lambda} = \frac{n}{2d} \cdot \frac{1}{\sin \theta} \tag{2}$$

The radiant energy is determined by:

$$E = h\nu = h \cdot \frac{c}{\lambda} \tag{3}$$

in which $h$ is Planck's constant and $c$ the velocity of light, so that the pulse height follows from:

$$V = A \frac{n}{d} \cdot \frac{1}{\sin \theta} \tag{4}$$

in which A is a constant. For a given analyzing crystal, $d$, the interplanar spacing is known so that the pulse height is inversely proportional to the sin $\theta$, or directly proportional to csc $\theta$, for a given order of reflection.

In the known device it is not easy to change the mean channel height in the right manner as a function of the deflection angle by an automatic control device. It has already been proposed to use a potentiometer for adjusting the channel height, of which potentiometer, in the case of synchronous shifting of the movable tapping with the angle of rotation of the crystal to be analyzed, between the movable tapping and one of the ends varies according to the prescribed function but this indication is of no substantial importance because such a resistor is not available. On the other hand, the construction of a mechanical transmission which converts a uniform motion into a cosecant function motion and a linear potentiometer can be used, is very difficult.

The object of the present invention is to mitigate this drawback and to simplify the device. For that purpose according to the invention, a device intended to analyze the X-ray fluorescent radiation comprising an amplitude filter having constant average channel height is provided with means to amplify all the electric pulses which are proportional to the radiated energy to an equal average height and subsequently to supply these pulses to the amplitude filter. The required amplification of the counting pulses is proportional to sin $\theta$. Such a method is easy to perform by means of a potentiometer having a sinusoidal resistance characteristic, the movable tapping of which is moved proportional to the angular velocity of the analyzing crystal. A mechanical coupling of the moving mechanism of crystal with the movable tapping of a linear resistor so that the tapping moves according to a sine function at constant angular velocity of the crystal, does not cause difficulties either.

In order that the invention may be readily carried into effect, one embodiment thereof will now be described by way of example with reference to the accompanying drawing, in which:

FIGURE 1 diagrammatically shows a device for X-ray fluorescent analysis according to the invention, and FIGURES 2 and 3 in two projections show the mechanical transmission which has the desired transmission ratio.

The object 1 to be examined is positioned in the beam of X-rays 3 emitted by the X-ray tube 2. In case of X-rays having a sufficiently short wave-length, the object 1 becomes a source of secondary rays indicated by fluorescent radiation and having a wave-length spectrum which is characteristic of the composition of the material of the object. In order to keep the divergency of the useful beam of secondary rays small, a small part 5 of this radiation is collected by a collimator 4 which may consist for example of a plurality of fine parallel tubes or parallel plates.

The beam of rays 5 is directed at the surface of the crystal plate 6, which is rotatable about a shaft 7 at right angles to the plane of the drawing. The radiation 9 reflected by said crystal is received by an X-ray radiation detector 8 after passing a collimator 10. The latter, like collimator 4, may consist of a plurality of fine parallel tubes or parallel plates.

The radiation detector 8 with the collimator 10, and the crystal plate 6, are rotatable about the shaft 7 in that sense that the angular velocity with which the crystal plate 6 rotates amounts to half the angular velocity with which the radiation detector 8 moves along the circle 11.

To determine the elements which the object contains and the quantity of the component elements, the radiation detector must convert the impinging radiation into electrical pulses, the amplitude of which corresponds to the energy constant of the fluorescent radiation. For that purpose, a proportional counter or a scintillation counter is used. The electrical pulses, after amplification, are supplied to a counting device 12. The aim is to select pulses which are characteristic of the nature of the substance and to keep interference pulses outside the registration as much as possible. For that purpose, the amplifier 13 has a narrow channel width so that pulses, the amplitude of which is larger than a given maximum value or smaller than a predetermined minimum value, do not reach the counting device 12. In order that the amplitude of pulses that have to be registered is of the order required for being permitted to pass through in any position of the radiation detector, the pulses are supplied to a pre-amplifier 14 provided in its output with a control device 15.

As already noted, the pulse height V is inversely proportional to the sine of the angle $\theta$. The control device 15 has for its purpose to control the pre-amplifier 14 and in combination all the effective pulses are amplified to the same height, which means that each of the pulses V is multiplied by a factor which is proportional to sin $\theta$. For that purpose, a potentiometer 18 is connected to the output terminals 16 and 17 of the pre-amplifier 14. The movable tapping 19 is adjusted in accordance with the position of the radiation detector and the adjustment has to be such that the signal derived between the tapping 19 and the output terminal 16 is constant. The resistance part between the tapping 19 and the fixed terminal 16 should then correspond to the value R' sin $\theta$, in which the value R' indicates the controllable part of the potentiometer 18, through which the tapping moves during one cycle of the movement of the radiation detector.

The rotation of the crystal 6 and of the radiation detector 8 together with the collimator 10 takes place by means of the motor 20 and the transmissions 21 and 22. The movement for displacing the movable tapping 19 on the potentiometer 18 is derived from a further transmission 23. This displacement must be synchronous to the moving crystal when a potentiometer is used of the type, the resistance of which varies according to a sine function with linear displacement of the movable tapping.

The desired resistance variation may also be obtained by means of an operating mechanism which causes a displacement of the movable tapping 19 along a linear potentiometer varying with the angular movement of the crystal 6 according to a sine function.

Such a mechanism is shown in FIGURES 2 and 3, in which the potentiometer 18 consists of a rotary potentiometer. It comprises a shaft 24 on which a pinion 25 is provided which engages a toothed rack 26. The toothed rack 26 is shiftable in its longitudinal direction and is supported by two sliding bearings 27 and 28. The displacement of the toothed rack 26 is effected by means of a crank shaft 29, the crank web 30 of which is mounted to the shaft 31. The crank shaft 29 runs in a slot 32 of the fork 33 which is connected to the toothed rack 26. With the largest angular movement of the analyzing crystal 6, the crank web 30 is in a vertical position. The toothed rack 26 is displaced entirely to the left as a result of which the movable tapping 19 on the potentiometer 18 is adjusted in the extreme left position. When rotating the analyzing crystal to smaller angles, the shaft 31 rotates proportional to the angular displacement of the crystal and moves the toothed rack 26 to the right. The coupling between the web 30 and the toothed rack 26 causes this movement to take place according to a sine function. At the same time, the movable tapping 19 turns. It is achieved in this manner that the resistance value between the terminals of the amplifier 13 varies according to R' sin $\theta$.

What is claimed is:

1. A device for analyzing the secondary radiation of an object provided in an X-ray beam, comprising an X-ray spectrometer having a radiation detector for converting X-rays into electrical pulses proportional to the intensity of the radiation, an amplitude filter having a constant average channel height for pulses, the heights of which lie between two values, and to amplify all the electric pulses which are proportional to the radiation energy and derived from the radiation detector to an equal average height and to supply the amplified pulses to the amplitude filter.

2. A device for analyzing secondary radiation of an object provided in an X-ray beam comprising means for separating and analyzing the secondary radiation of the object including an analyzing crystal rotatable about a given axis and a radiation detector rotatable about said given axis for converting X-rays diffracted by said crystal into electrical pulses having heights proportional to the intensity of the radiation, means coupled to said radiation detector for linearly amplifying the pulses produced by said detector, impedance means coupled to the amplifier means, means coupled to the crystal for varying the impedance of said impedance means proportional to the sine of the angle at which radiation is diffracted by said crystal to derive pulses having a constant average height, and means coupling said impedance means to an amplitude filter having a constant average channel height for pulses.

3. A device as claimed in claim 2 in which the impedance means is a potentiometer having a movable contact which is coupled to the analyzing crystal.

4. A device as claimed in claim 3 in which the potentiometer has a resistance characteristic which varies according to a sine function with the displacement of the movable contact, the movable contact being moved synchronously with the rotation of the analyzing crytsal.

5. A device as claimed in claim 3 in which the potentiometer has a resistance characterisitc which varies linearly with the displacement of the movable contact the movement of which varies according to a sine function of the angle of diffraction of the analyzing crystal.

6. A device as claimed in claim 5 in which movement of the movable contact of the potentiometer is controlled by transmission means coupled to the analyzing crystal comprising a toothed rack movable rectilinearly by crank means coupled to the analyzing crystal for synchronous movement therewith, said toothed rack being coupled to the movable contact of the potentiometer.

References Cited in the file of this patent
UNITED STATES PATENTS
2,837,655     Lang _____ June 3, 1958